Figure 1:
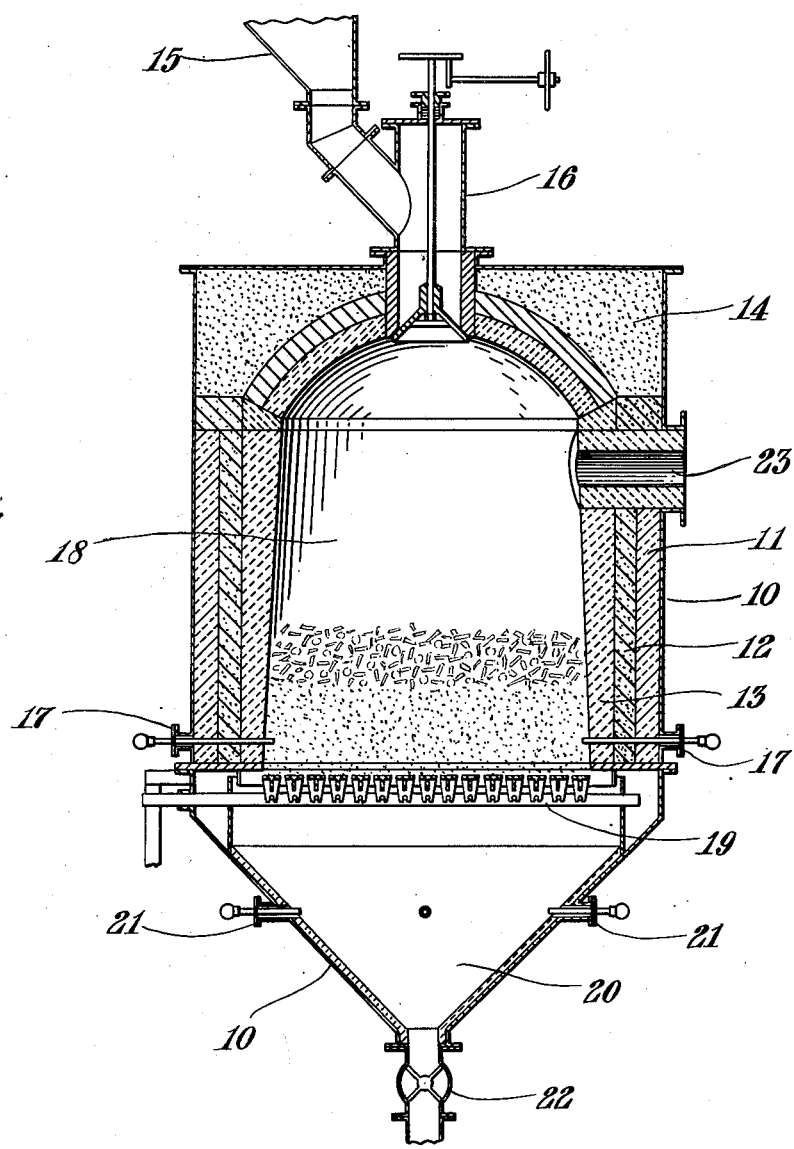

June 19, 1945.  W. Y. AGNEW ET AL  2,378,675
PROCESS FOR HALOGENATION
Filed Aug. 8, 1942

SANDFORD S. COLE & WILLIAM Y. AGNEW
INVENTORS.

BY Charles F. Kargebel
ATTORNEY

Patented June 19, 1945

2,378,675

UNITED STATES PATENT OFFICE 2,378,675

PROCESS FOR HALOGENATION

William Y. Agnew, Little Silver, and Sandford S. Cole, Metuchen, N. J., assignors to National Lead Company, New York, N. Y., a corporation of New Jersey Application August 8, 1942, Serial No. 454,192

3 Claims. (Cl. 23—87)

The present invention relates both to a novel apparatus and method for halogenation of materials, such as iron-, aluminum-, tin- and titanium-containing minerals or concentrates.

In the prior art, halogenation operations were conducted either continuously or as batch processes. Generally, whether the operation was carried out continuously or as a batch process, an apparatus consisting essentially of an upright hollow shaft, or tower, was employed. Into such towers, usually referred to as "chlorinating" or "halogenating towers," the material to be halogenated was introduced at the top, halogen gas, or halogen gas and other gas, e. g. air, were introduced near the bottom of the tower through the same or separate inlet ports. The vaporized halides passed out at the top and unreacted and unreactable material was removed at the bottom, either continuously or in batches.

In such prior art operations, a bed of hot cinder collected at the bottom of the tower below the gas inlet ports. The removal of this hot cinder containing diffused halogen gas was a very bothersome procedure. Metal parts of the removal equipment were rapidly corroded or burned out requiring frequent replacement and, at the same time, the handling of the hot cinder involved a certain industrial hazard. The present invention constitutes a simple and effective means for overcoming the difficulties inherent in prior art halogenation operations.

It is, therefore, among the objects of the present invention to provide means for effectively halogenating materials while avoiding the destructive effects of halogen gas and elevated temperature. Also, among the objects of the invention is the provision of means for continuous removal of cinder from a halogenation tower.

Fig. 1 is a vertical cross-sectional representation of a preferred embodiment of an apparatus constructed in accordance with the invention.

Reference numeral, 10, is the outer shell, or casing of the halogenating tower having a conical bottom portion. This shell which may be of any suitable material, e. g., steel, is lined successively with insulating material, 11, an acid-resisting material, 12, such as, acid-proof brick, and with a refractory material, 13, capable of withstanding the effects of the reaction temperature and hot gases involved therein, e. g., acid proof brick. Loose insulating material, 14, is packed between the roof of the reaction chamber, 18, and the top of the outer shell. The means for charging the tower consist of a hopper, 15, and charging valve, 16. Tuyères, 17, are provided toward the bottom of the reaction chamber, 18, for the introduction of halogen gas. At the bottom of the reaction chamber a shaker grate, 19, is installed which is operatively connected with means, not shown, for shaking the grate. The conical bottom of the outer shell of the tower forms a pit, 20, for receiving ash passing through the grate. Set in the side of this conical ash pit are tuyères, 21, for the introduction of air, or other gas, below the level of the grate. At the bottom of the ash pit is provided a valve, 22, for discharging ash. The volatilized halides pass out through the outlet port, 23.

It will be seen from Fig. 1, and the foregoing description that the novel apparatus of the invention differs from prior art halogenating towers in that, according to the present invention, a shaker grate is provided at the bottom of the reaction vessel above which are inlet means for introducing halogen gas into the reaction chamber and below which are inlet means for introducing air, or other gases.

The operation of the apparatus and the novel method for halogenation may now be explained. In this connection it will be understood that both apparatus and method are useful for the halogenation of any material capable of reacting with halogen gas to form a volatile halide. Thus, according to the invention, aluminum chloride can be produced from an aluminum-containing material, e. g., bauxite, tin chloride can be produced from tin-containing material, iron chloride from iron-containing material, etc. The invention may also be employed to separate materials containing a plurality of elements which form volatile halides and when so used conditions are controlled to accomplish what may be termed "preferential fractional halogenation. Solely by way of illustration, the chlorination of titaniferous material has been selected for the purpose of explaining the invention.

One titaniferous material especially suitable for chlorination is titanium dioxide concentrate obtained from a titaniferous mineral, for instance, by leaching ilmenite ore with a mineral acid in such a manner as to dissolve a substantial proportion of the iron present in the ore leaving a residue richer in titanium dioxide than the original mineral. Such a concentrate, for efficient chlorination should be briquetted with a minor amount of a carbonaceous material, e. g., powdered coal, using a suitable binding material such as pitch or molasses, after which the briquettes are carbonized.

At the start of the chlorination operation, it is preferable to raise the temperature of the reaction chamber to a point, say about 600° C., at which temperature chlorine gas will readily react with the titaniferous material to form titanium tetrachloride. This initial heating may be accomplished in any convenient manner. If desired, heating means may be installed within the reaction chamber. A preferred method of heating the reaction chamber is to charge it through the hopper 15 and the charging valve, 16, with hot coke, introducing air, or oxygen, through the tuyères, 21, and igniting the coke.

When the temperature has reached the desired point the preheated briquetted titaniferous material is introduced through the hopper 15, and the charging valve 16, and chlorine gas is introduced through the tuyères, 17. Reaction starts promptly which, due to its exothermic nature, can be maintained without external heat by proper regulation of the rates of addition of the titaniferous material, chlorine, and air, or oxygen. As will be appreciated the chlorine acts upon the briquettes to form titanium tetrachloride while simultaneously the air, or oxygen, maintains the temperature by the combustion of the carbonaceous material. The volatilized titanium tetrachloride escapes through the outlet port, 23, while the unchlorinated cinders settle toward the bottom of the chamber. Periodically, or continuously, as the case may be the grate, 19, is shaken in order to dump the cinders into the ash pit, 20, from whence through the ash gate, or valve, 22, they are eliminated.

As has been mentioned, throughout the operation the chlorine, or other halogen gas, is introduced above the grate while air, or oxygen, is introduced below the grate. This introduction of air or other gas below the grate serves to cool the grate and the bed of ash directly above the grate thus preventing corrosion and burning out of the grate. Accordingly, it will be seen that the invention provides a simple and economical means for halogenating material including means for the elimination of non-halogenated ash or cinder while insuring that said means for removing the ash shall not be corroded or burned out.

The foregoing description of the present invention has been given merely for illustrative purposes and no undue limitations should be deduced therefrom. It will be understood, therefore, that changes or modifications capable of accomplishment by the exercise of mere skill of the art are to be embraced within the scope of this invention.

We claim:

1. Process for halogenation which comprises supporting a charge of halogenatable material upon a movable framework base within a reaction vessel, introducing halogenating gas into said reaction vessel above said framework base and oxidizing gas below said base while maintaining the charge at halogenating temperature, moving said framework during the halogenating reaction to eliminate unreacted material and gangue from said reaction vessel and withdrawing reaction gases from said vessel.

2. Process for halogenation which comprises supporting a charge of halogenatable material upon a metallic shaker grate within a reaction vessel, introducing halogenating gas into said reaction vessel above said grate while maintaining the charge at halogenating temperature, cooling said grate by introducing oxidizing gas below said grate, shaking said grate during the halogenation reaction to eliminate unreacted material and gangue from said reaction vessel and withdrawing reaction gases from said vessel.

3. Process for the chlorination of ilmenite which comprises supporting a charge of ilmenite briquetted with carbonized carbonaceous material upon a metallic shaker grate within a chlorinating vessel, introducing chlorine gas into said reaction vessel above said grate while maintaining the charge at chlorination temperature, introducing oxidizing gas into the reaction vessel below said grate, shaking said grate during the chlorination to eliminate unreacted material and gangue from said reaction vessel and withdrawing chloride gases from said vessel.

WILLIAM Y. AGNEW.
SANDFORD S. COLE.